March 18, 1930.  G. H. ZENNER  1,751,435

NECK RING FOR COMPRESSED GAS CONTAINERS

Filed Feb. 2, 1928

INVENTOR:
George H. Zenner,
BY
Byrnes Townsend & Brickenstein,
ATTORNEYS.

Patented Mar. 18, 1930

1,751,435

UNITED STATES PATENT OFFICE

GEORGE H. ZENNER, OF NEW YORK, N. Y., ASSIGNOR TO THE LINDE AIR PRODUCTS CO., A COMPANY OF OHIO

NECK RING FOR COMPRESSED-GAS CONTAINERS

Application filed February 2, 1928. Serial No. 251,327.

My invention relates to devices for protecting the valve in the ends of compressed gas containers, and more specifically to a combined protecting device and handle for such containers.

Containers for confining gas under pressure are usually cylindrical in form and they have a constricted portion or neck at one end, which is threaded internally for mounting the valve. The valve is protected by means of a cap which is screwed down over a ring that is held in place by peening the end of the neck of the cylinder over the ring. In handling the cylinders, as by rolling them on one end, the cap is a convenient place to grasp the cylinder but it sometimes unscrews or slips off and permits the cylinder to fall and injure the workmen. If a cylinder is to be lifted, it is difficult to secure a rope or a chain to the cylinder so that the cylinder will not be dropped.

It is among the objects of my invention to provide a handle for gas containers in connection with the valve protecting mounting so that the cylinder may be lifted by that means or so that it may be supported therefrom when it is rolled on one end.

Figure 1:
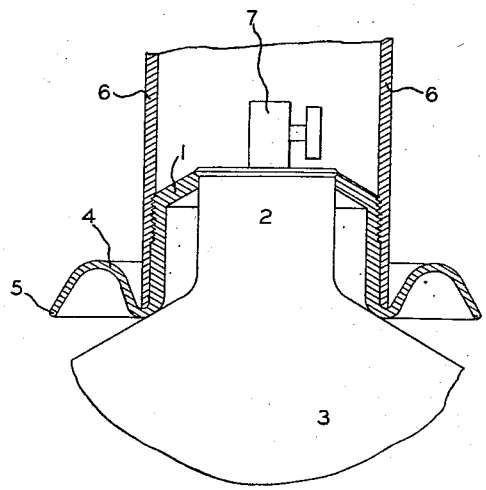

One modification of my invention as shown in the sectional view in Figure 1 of the drawing consists of a collar 1 which is secured by peening over the end of the neck 2 of the cylinder 3. The lower portion 4 of the collar is flared away from the cylinder and a flange 5 is formed in the outer periphery of the flared portion. The collar 1 may be externally threaded and an internally threaded cap 6 screwed on the collar to protect the valve 7. The flared portion 4 which may be in the form of a ring preferably has an inversely curved cross section with the outer periphery of the curve extending downwardly thereby forming a ledge for engaging the fingers or a hook when the cylinder is lifted.

Figure 2:
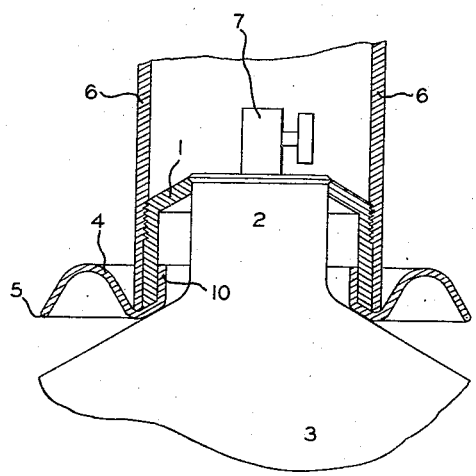

Another modification of my device as shown in Figure 2 consists of a ring 4 having an inwardly up-turned flange 10. The ring is placed over the neck of the cylinder and the collar 1 is formed at its lower extremity so that it will slip over the flange 10. When the collar is held in place by peening over the end of the cylinder neck, the ring will be securely mounted between the collar and the wall of the cylinder. The ring 4 which forms a handle for the cylinder is preferably provided with an inverse flange on its outer periphery to form a ledge 5.

Although two modifications of my invention have been specifically described other modifications of my device are within the scope of my invention. The flanged ring may be formed with its outer portion normal to the axis of the cylinder so that a cord or a chain can be passed around the cylinder underneath the flange. For securing a hook, the ring may be perforated. Although I prefer to have the handle portion 4 in the form of a ring, I may form it from one or more portions of the ring. As various other modifications of my device may be made within the scope of my invention I desire to be limited only by the prior art and the invention as defined in the annexed claims.

I claim as my invention:

1. The combination with a gas container, of a protective device comprising a collar secured to a portion of the container, a cap adapted to be secured to said collar and to enclose the same and a member projecting from said collar, said member being reversely curved and the extremity being spaced from the wall of the container.

2. The combination with a gas container, of a protective device comprising a collar secured to a portion of the container, a cap adapted to be secured to said collar and to enclose the same and a member projecting from said collar, said member being spaced from the wall of the container and having a curved peripheral portion which is out of contact with the cylinder at its extremity.

3. The combination with a gas container, of a protective device comprising a collar secured to a portion of the container, said collar having one portion thereof spaced apart from the container, a cap detachably mounted on said collar, a ring extending from said collar having its extremity spaced from the wall of said container and an inner flange on said ring over-lapped by the spaced-apart portion of said collar for mounting the ring.

4. The combination of a gas container, of a protective device comprising a collar secured to a portion of the container, said collar having one portion thereof spaced apart from the container, a cap detachably mounted on said collar, a ring extending from said collar and spaced from the wall of said container, an outer peripheral flange on said ring and an inner reversely-curved flange on said ring engaging the spaced-apart portion of said collar for mounting the ring.

In testimony whereof, I affix my signature.

GEORGE H. ZENNER.